(12) United States Patent
Zähe

(10) Patent No.: US 11,680,551 B2
(45) Date of Patent: Jun. 20, 2023

(54) PRESSURE-COMPENSATED PROPORTIONAL FLOW CONTROL VALVE WITH AN INTEGRATED TURBINE FOR FLOW RATE SENSING

(71) Applicant: Sun Hydraulics, LLC, Sarasota, FL (US)

(72) Inventor: Bernd Zähe, Sarasota, FL (US)

(73) Assignee: Sun Hydraulics, LLC, Sarasota, FL (US)

( * ) Notice: Subject to any disclaimer, the term of this patent is extended or adjusted under 35 U.S.C. 154(b) by 0 days.

(21) Appl. No.: 17/680,704

(22) Filed: Feb. 25, 2022

(65) Prior Publication Data
US 2022/0397211 A1     Dec. 15, 2022

Related U.S. Application Data

(60) Provisional application No. 63/209,441, filed on Jun. 11, 2021.

(51) Int. Cl.
| | |
|---|---|
| *F15B 13/02* | (2006.01) |
| *G01F 1/115* | (2006.01) |
| *F16K 37/00* | (2006.01) |
| *F03B 13/00* | (2006.01) |
| *F16K 17/04* | (2006.01) |

(Continued)

(52) U.S. Cl.
CPC ............ *F03B 13/00* (2013.01); *F15B 13/02* (2013.01); *F15B 13/026* (2013.01); *F15B 15/00* (2013.01); *F15B 21/14* (2013.01); *F16K 11/07* (2013.01); *F16K 17/048* (2013.01); *F16K 37/005* (2013.01); *G01F 1/115* (2013.01); *G01F 1/1155* (2013.01); *G01F 15/005* (2013.01);

(Continued)

(58) Field of Classification Search
CPC .......... F15B 13/026; F15B 2211/30535; F16K 37/005; F16K 37/0091; G01F 1/115
See application file for complete search history.

(56) References Cited

U.S. PATENT DOCUMENTS

| | | | |
|---|---|---|---|
| 3,701,277 A | 10/1972 | McMahon et al. | |
| 4,566,317 A | 1/1986 | Shakra | |

(Continued)

FOREIGN PATENT DOCUMENTS

| | | | |
|---|---|---|---|
| CN | 101379330 B | | 9/2012 |
| CN | 212616695 U | * | 2/2021 |

*Primary Examiner* — Thomas E Lazo
(74) *Attorney, Agent, or Firm* — McDonnell Boehnen Hulbert & Berghoff LLP

(57) ABSTRACT

An example valve includes: a pressure compensation spool configured to be subjected to a first fluid force of fluid received at a first port acting in a proximal direction; a pressure compensation spring disposed in a pressure compensation chamber and applying a biasing force on the pressure compensation spool in a distal direction; a turbine configured to rotate as fluid flows through the valve; and a flow area configured to throttle fluid flow from the first port to the pressure compensation chamber, wherein fluid in the pressure compensation chamber applies a second fluid force on the pressure compensation spool in the distal direction, such that the pressure compensation spool moves to a particular axial position based on force equilibrium between the first fluid force, the second fluid force, and the biasing force to throttle fluid flow from the pressure compensation chamber to a second port.

20 Claims, 5 Drawing Sheets

(51) Int. Cl.
  *H02K 7/18* (2006.01)
  *G01F 15/00* (2006.01)
  *G01F 15/06* (2022.01)
  *F15B 15/00* (2006.01)
  *F16K 11/07* (2006.01)
  *F15B 21/14* (2006.01)

(52) U.S. Cl.
  CPC ......... *G01F 15/066* (2013.01); *H02K 7/1823* (2013.01); *F05B 2220/706* (2013.01)

(56) References Cited

U.S. PATENT DOCUMENTS

| | | | |
|---|---|---|---|
| 5,152,142 A * | 10/1992 | Budzich | F15B 21/14 |
| | | | 137/596.1 |
| 6,789,434 B2 | 9/2004 | Peterson | |
| 7,624,632 B1 | 12/2009 | Hoyle et al. | |
| 11,105,433 B2 * | 8/2021 | Zähe | F15B 13/025 |
| 2004/0060603 A1 * | 4/2004 | Song | G01F 1/115 |
| | | | 137/554 |
| 2012/0325016 A1 | 12/2012 | Peled | |
| 2013/0287601 A1 * | 10/2013 | Mori | F15B 19/002 |
| | | | 417/364 |
| 2020/0088554 A1 * | 3/2020 | Vromans | G01F 1/08 |
| 2021/0310838 A1 | 10/2021 | Dietel | |

* cited by examiner

PRESSURE-COMPENSATED PROPORTIONAL FLOW CONTROL VALVE WITH AN INTEGRATED TURBINE FOR FLOW RATE SENSING

CROSS REFERENCE TO RELATED APPLICATION

The present application claims priority to U.S. Provisional patent application Ser. No. 63/209,441, filed on Jun. 11, 2021, and entitled "Pressure-Compensated Flow Control Valve with an Integrated Turbine for Energy Harvesting or Flow Rate Sensing," the entire contents of which are herein incorporated by reference as if fully set forth in this description.

BACKGROUND

A hydraulic valve directs the flow of a liquid medium, usually oil, through a hydraulic system. The direction of the oil flow is determined by the position of a movable element such as a spool, piston, or poppet. The size of the valve may be determined by the maximum flow of the hydraulic system through the valve and the maximum system pressure.

In some applications, it may be desirable to measure or sense the fluid flow rate through the valve. This may be accomplished by measuring the stroke of the movable element, but such measurement might not be accurately correlated with the flow rate under some conditions and might not be feasible in some applications.

A separate flow meter may be added to the system, downstream or upstream from the valve. The hydraulic line between the valve and the flow meter has a capacitance, and such capacitance may cause a delay in the flow measurement by the flow meter. As such, it may be desirable to integrate flow sensing capability into the valve to reduce or eliminate such capacitance. It is with respect to these and other considerations that the disclosure made herein is presented.

SUMMARY

The present disclosure describes implementations that relate to a pressure-compensated proportional flow control valve with an integrated turbine for flow rate sensing.

In a first example implementation, the present disclosure describes a valve. The valve includes: (i) a pressure compensation spool configured to be subjected to a first fluid force of fluid received at a first port of the valve acting on the pressure compensation spool in a proximal direction; (ii) a pressure compensation spring disposed in a pressure compensation chamber and applying a biasing force on the pressure compensation spool in a distal direction; (iii) a turbine configured to rotate as fluid received at the first port flows through the valve; and (iv) a throttling flow area configured to throttle fluid flow from the first port to the pressure compensation chamber, wherein fluid in the pressure compensation chamber applies a second fluid force on the pressure compensation spool in the distal direction, such that the pressure compensation spool moves to a particular axial position based on force equilibrium between the first fluid force, the second fluid force, and the biasing force to throttle fluid flow from the pressure compensation chamber to a second port of the valve, thereby causing a pressure differential across the turbine and the throttling flow area to be maintained substantially constant.

In a second example implementation, the present disclosure describes a hydraulic system. The hydraulic system includes: an actuator comprising a cylinder and an actuator piston slidably-accommodated within the cylinder, wherein the actuator piston divides an inner space of the cylinder to a first chamber and a second chamber; a directional control valve configured to direct fluid flow to and from the first chamber and the second chamber of the actuator; a source of fluid flow; and the valve of the first example implementation, wherein the first port of the valve is fluidly-coupled to the source of fluid flow and the second port is fluidly-coupled to the directional control valve. The hydraulic system further includes a controller configured to perform operations comprising: receiving sensor information from the valve to determine actual fluid flow rate through the valve; comparing the actual fluid flow rate to a target fluid flow rate, and based on the comparing, providing an actuation signal to the valve to achieve the target fluid flow rate.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

In examples, a flow control valve can have a throttling spool that, in an unactuated state, blocks a throttling opening to preclude fluid flow from a first port to a second port. The valve can have an actuation mechanism such as a manual actuator, a solenoid actuator, or an electric motor, and when the valve is actuated, the throttling spool moves, thereby gradually exposing the opening and allowing fluid flow from the first port to the second port.

In an example, it may be desirable to configure the valve as a pressure-compensated valve. Such valve may include another spool that moves within the valve to change the size of a pressure compensation opening to maintain a constant pressure drop or pressure differential across the throttling flow opening. This way, a substantially linear relationship exists between the fluid flow rate and the size of the throttling opening.

In example disclosed valves, a turbine is integrated within the pressure-compensated valve. The term "turbine" is used herein to indicate rotary mechanical device including a rotary component such as an impeller, for example, which extracts energy from a fluid flow. As fluid flows across the turbine, fluid rotates the turbine.

In an example, the turbine can be used for flow rate sensing. Particularly, the valve can be configured to include a Hall Effect sensor with the turbine. The Hall Effect sensor may generate an electric signal indicative of rotational speed of the turbine and a count of the revolutions of the turbine as fluid flows across the turbine. Such signal can be used to determine the fluid flow rate across the valve. As such, the valve can operate as a flow meter in addition to being a pressure-compensated valve throttling fluid from one port to another.

By virtue of being a pressure-compensated valve, the pressure differential across the turbine and a variable metering orifice can be maintained substantially constant and controlled. With this configuration, flow forces may be reduced and accuracy of the flow meter may be enhanced.

Figure 1:
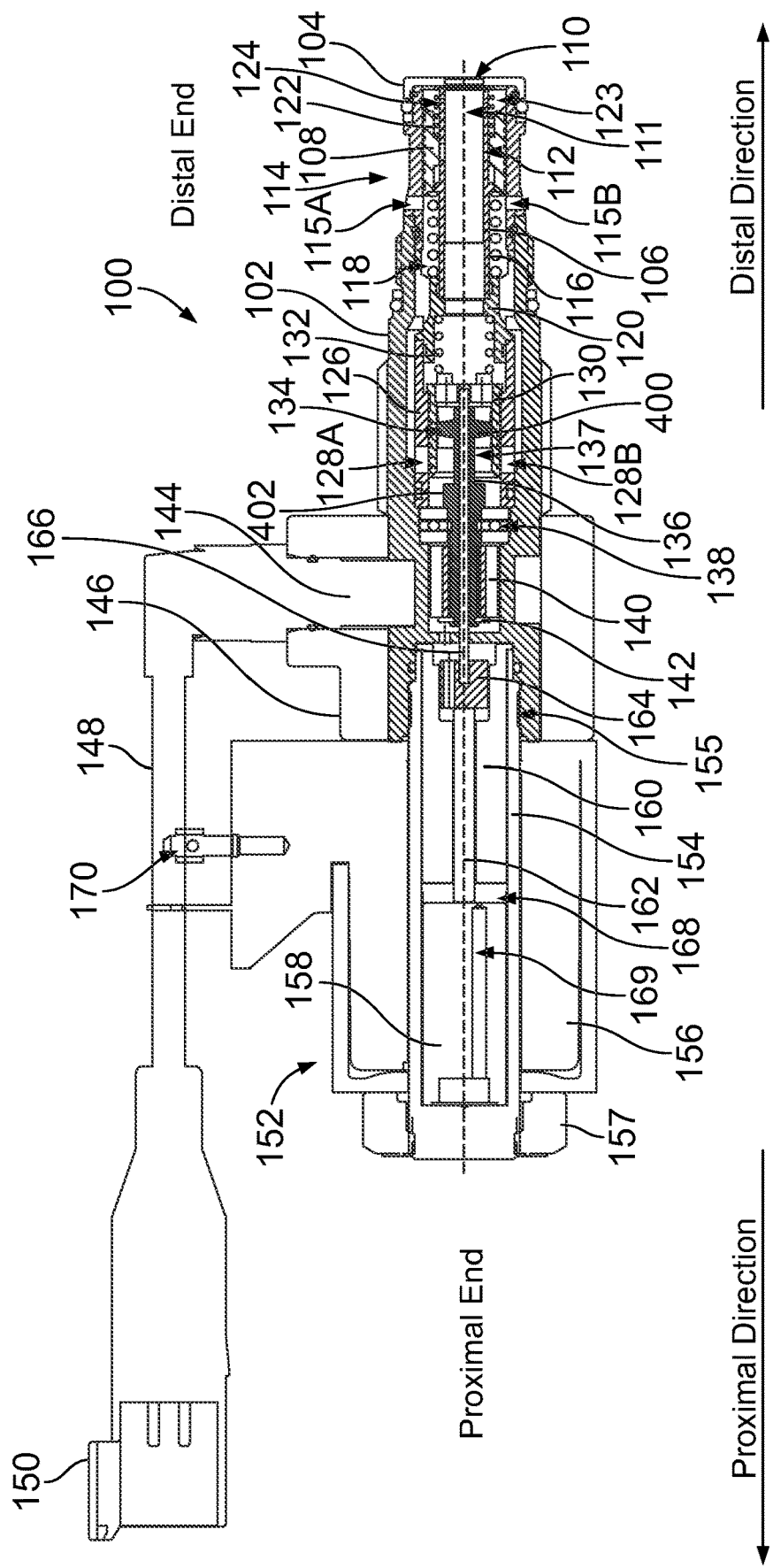
FIG. 1 illustrates a cross-sectional side view of a valve with an integrated flow rate sensor, in accordance with an example implementation.

FIG. 1 illustrates a cross-sectional side view of a valve 100 with an integrated flow rate sensor, in accordance with an example implementation. The valve 100 may be inserted or screwed into a manifold having ports corresponding to ports of the valve 100 described below, and the manifold can fluidly couple the valve 100 to other components of a hydraulic system.

The valve 100 includes a housing 102 having a longitudinal cylindrical cavity therein. The longitudinal cylindrical cavity of the housing 102 is configured to house components of the valve 100.

The valve 100 includes a nose piece 104 coupled to the housing 102 and disposed at a distal end of the housing 102. The nose piece 104 is ring-shaped and thus allows fluid flow therethrough. The valve 100 also includes an inner sleeve or tube 106 that is fixedly-disposed within the longitudinal cylindrical cavity of the housing 102.

The valve 100 also includes a pressure compensation spool 108 disposed within the longitudinal cylindrical cavity of the housing 102. The pressure compensation spool 108 can also be referred to as a pressure compensation piston. The pressure compensation spool 108 is slidably-accommodated between the exterior surface of the tube 106 and the interior surface of the housing 102. As such, the pressure compensation spool 108 is axially-movable about the exterior surface of the tube 106 within the housing 102. The term "slidably accommodated" is used throughout herein to indicate that a first component (e.g., the pressure compensation spool 108) is positioned relative to a second component (e.g., the tube 106) with sufficient clearance therebetween, enabling movement of the first component relative to the second component in the proximal and distal directions. As such, the first component (e.g., the pressure compensation spool 108) is not stationary, locked, or fixedly disposed in the valve 100, but is rather allowed to move relative to the second component (e.g., the tube 106).

The valve 100 includes a first port 110 at a nose or distal end of the tube 106 where fluid is allowed to flow through the nose piece 104. In one mode of operation of the valve 100, the first port 110 is configured as an inlet port that is fluidly-coupled to a source of fluid (e.g., a pump, an accumulator, a hydraulic actuator discharging fluid, etc.) capable of providing fluid at high pressure levels (e.g., 1000-5000 pounds per square inch (psi)). In another mode of operation, the first port 110 can be an outlet port fluidly coupled to other parts of a hydraulic system or a fluid reservoir.

As shown in FIG. 1, the tube 106 is configured as a hollow cylinder, and has a main chamber 111 therein, where the main chamber 111 is fluidly coupled to the first port 110. The tube 106 also has a set of cross-hole(s) 112, disposed in a circumferential array about the tube 106. In the position shown in FIG. 1, the pressure compensation spool 108 blocks the cross-hole(s) 112 of the tube 106.

The term "block" is used throughout herein to indicate substantially preventing fluid flow except for minimal or leakage flow of drops per minute, for example. The term "hole" is used generally herein to indicate a hollow place (e.g., cavity) in a solid body or surface, for example. The term "cross-hole" is used herein to encompass any type of opening (e.g., slot, window, hole, etc.) that crosses a path of, or is formed transverse relative to, another hole, cavity, or channel.

The valve 100 further includes a second port 114. The second port 114 can include one or pressure compensation cross-holes, such as pressure compensation cross-holes 115A, 115B, disposed in the housing 102 in a circumferential array about the housing 102.

The valve 100 further includes a pressure compensation spring 116 disposed in a pressure compensation chamber 118 formed within the housing 102. The pressure compensation spring 116 is disposed about the exterior surface of the tube 106 and is configured to apply a biasing force on the pressure compensation spool 108 in the distal direction. Particularly, the distal end of the pressure compensation spring 116 can contact or interface with the proximal end of the pressure compensation spool 108, whereas the proximal end of the pressure compensation spring 116 rests against a bushing 120 that is fixedly disposed within the housing 102.

Figure 2:
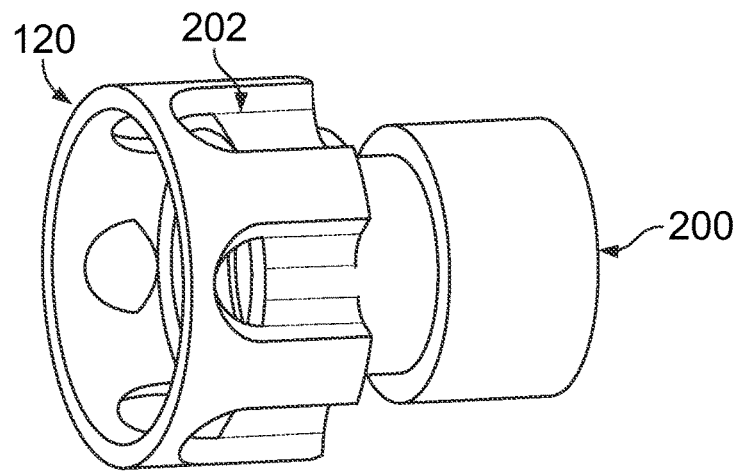
FIG. 2 illustrates a perspective view of a bushing, in accordance with an example implementation.

FIG. 2 illustrates a perspective view of the bushing 120, in accordance with an example implementation. The proximal end of the pressure compensation spring 116 rests against a distal end 200 of the bushing 120. With this configuration, the pressure compensation spring 116 applies a biasing force against the proximal end of the pressure compensation spool 108 to bias the pressure compensation spool 108 in the distal direction. As an example for illustration, the pressure compensation spring 116 can be 150 psi spring.

As shown in FIG. 2, the bushing 120 can include a plurality of slots disposed in a circumferential array about the bushing 120, such as slot 202. These slots allow fluid flow about the bushing 120 as described below.

Referring back to FIG. 1, the valve 100 further includes a reverse flow spring 122 disposed between the nose piece 104 and the pressure compensation spool 108. Particularly, the reverse flow spring 122 is disposed about the exterior surface of the tube 106 in a spring chamber 123 within the housing 102.

The distal end of the reverse flow spring 122 is fixed against the nose piece 104, and therefore the reverse flow spring 122 applies a respective biasing force on the pressure compensation spool 108 in the proximal direction. The reverse flow spring 122 is weaker than the pressure compensation spring 116. For example, the reverse flow spring 122 can be a 10 psi spring.

The tube 106 has a set of cross-holes such as cross-hole 124 that is configured to fluidly couple the main chamber 111, which is fluidly-coupled to the first port 110, to the spring chamber 123. This way, fluid received at the first port 110 is provided to the spring chamber 123, and such fluid applies a fluid force on the pressure compensation spool 108 in the proximal direction.

The valve 100 further includes a sleeve 126 fixedly-disposed within the housing 102. The distal end of the sleeve 126 interfaces with the bushing 120. The sleeve 126 includes a set of throttling cross holes, such as throttling cross-hole 128A and throttling cross-hole 128B.

The valve 100 further includes a throttling spool 130 that is slidably-accommodated within the sleeve 126 such that the throttling spool 130 is axially-movable. The throttling spool 130 can also be referred to as a throttle, a piston, or a throttling element.

Figure 3:
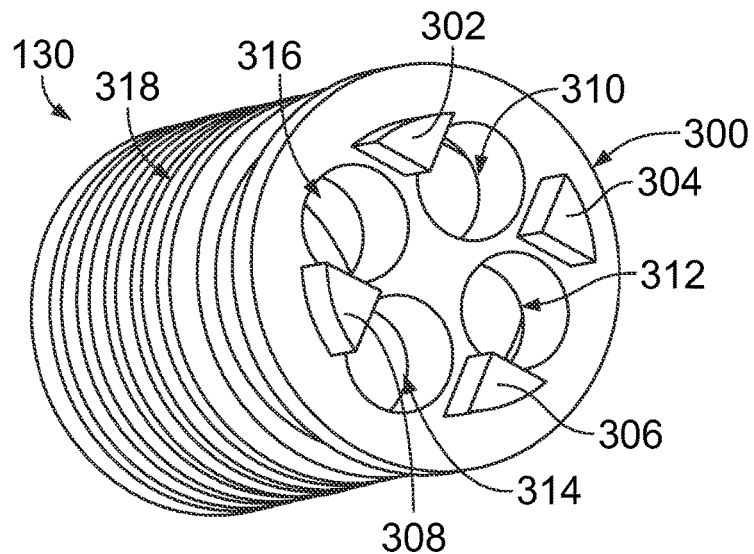
FIG. 3 illustrates a perspective view of a throttling spool, in accordance with an example implementation.

FIG. 3 illustrates a perspective view of the throttling spool 130, in accordance with an example implementation. As shown, the a distal end 300 of the throttling spool 130 can be milled to form flat portions such as flat portion 302, flat portion 304, flat portion 306, and flat portion 308. More or fewer flat portions can be used.

Further, the throttling spool 130 has a plurality of longitudinal through-holes, such as through-hole 310, through-hole 312, through-hole 314, and through-hole 316. The through-holes 310-316 allow fluid flow through the throttling spool 130. The throttling spool 130 further includes a plurality of balance annular grooves 318. During operation of the valve 100, the balance annular grooves 318 are filled with fluid for lubrication and facilitation of axial movement of the throttling spool 130.

Referring to FIGS. 1-2 together, the valve 100 includes a throttling spring 132 that has a distal end resting against the bushing 120 and a proximal end resting against the flat portions 302-308 of the throttling spool 130. This way, the throttling spring 132 does not interfere with fluid flow through the through-holes 310-316 of the throttling spool 130.

In the closed state of the valve 100 shown in FIG. 1, the throttling spool 130 blocks the throttling cross-holes 128A, 128B. As such, fluid flow from the first port 110 is blocked from flowing to the second port 114.

The valve 100 further includes a flow rate meter or flow rate sensor integrated therein. Particularly, the valve 100 includes a turbine 134 that includes a turbine shaft 136. The turbine 134 is disposed in a turbine chamber 137.

Figure 4A:
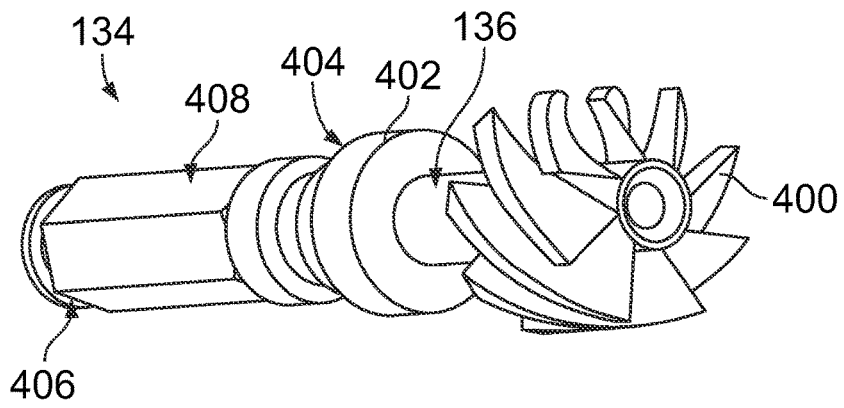
FIG. 4A illustrates a perspective view of a turbine, in accordance with an example implementation.

FIG. 4A illustrates a perspective view of the turbine 134, in accordance with an example implementation. The turbine 134 has an impeller 400 mounted to, or integrated with, the turbine shaft 136. The impeller 400 includes fins or blades that rotate as fluid passes across the impeller 400.

The turbine shaft 136 can have an enlarged diameter section 402, forming a shoulder 404. A proximal end of the turbine shaft 136 has an annular groove 406. A shaft portion 408 of the turbine shaft 136 can have a hexagonal exterior surface.

Referring back to FIG. 1, the valve 100 further includes a thrust bearing 138 that is retained between the proximal end of the sleeve 126 and a shoulder formed in the housing 102 as shown in FIG. 1.

The thrust bearing 138 can be any type of thrust bearings such as a thrust ball bearing, a cylindrical thrust roller bearing, a tapered roller thrust bearing, a spherical roller thrust bearing, a fluid bearing, a magnetic bearing, or a needle bearing. For example, as depicted in FIG. 1, the thrust bearing 138 can have a distal race, a proximal race, and a plurality of balls retained in a nylon cage. The shoulder 404 of the turbine 134 rests against the distal race of the thrust bearing 138. The distal race rotates with the turbine 134, whereas the proximal race remains stationary. This way, the thrust bearing 138 is configured to support axial loads to which the turbine 134 is subjected while facilitating rotary motion of the turbine 134.

Figure 4B:
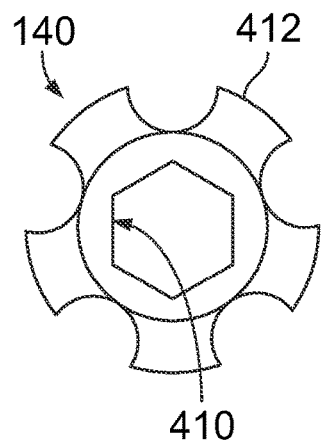
FIG. 4B illustrates a front view of a wheel, in accordance with an example implementation.

The valve 100 further includes a wheel 140 mounted to the turbine shaft 136 and rotatable therewith. FIG. 4B illustrates a front view of the wheel 140, in accordance with an example implementation. As depicted, the wheel 140 is hollow, and has an interior hexagonal surface 410 that facilitates mounting the wheel 140 to the shaft portion 408 (which has a corresponding hexagonal exterior surface) of the turbine shaft 136. This way, the wheel 140 rotates with the turbine shaft 136 and the impeller 400. The wheel 140 has several teeth, blades, or fins, such as fin 412, with channels therebetween to allow fluid flow through the wheel 140.

Referring back to FIG. 1, the wheel 140 is retained axially to the turbine shaft 136 via a retaining ring 142 (e.g., an E-clip) disposed in the annular groove 406 of the turbine shaft 136. A gap (e.g., a 0.001 inch gap) exists between a distal end of the wheel 140 and the proximal race of the thrust bearing 138. This way, the wheel 140 might not interact with or contact the thrust bearing 138 to prevent any friction therebetween that could affect performance of the turbine 134. The reduced friction may allow the turbine 134 to rotate as small flow rates. Although in the example implementation shown in the figures, the thrust bearing 138 is disposed at the distal end of the wheel 140, in other example implementation, the thrust bearing 138 can be disposed at the proximal end of the wheel 140.

The valve 100 further includes a Hall Effect sensor 144 disposed, at least partially, within the housing 102 adjacent the wheel 140. The Hall Effect sensor 144 is retained to the housing 102 via a sensor retainer 146.

The Hall Effect sensor 144 is configured to sense the rotations of the wheel 140, which are the same as the rotations of the turbine 134. Particularly, the Hall Effect sensor 144 is configured to count the revolutions of the wheel 140 in a predetermined period of time.

In an example, the blades or fins (e.g., the fin 412) the wheel 140 can have magnets or magnetic material embedded therein. In another example, the fins of the wheel 140 are made from a magnetic material. The Hall Effect sensor 144 then senses the rotations of the wheel 140 (i.e., counts the revolutions of the wheel 140) by way of interacting with the magnetic material in the wheel 140. In other words, the Hall Effect sensor 144 detects changes in a magnetic field as the wheel 140 rotates. The Hall Effect sensor 144 then communicates a signal indicative of the counted revolutions via a cable 148 and connector 150 to an electronic processor or controller (e.g., the controller 730 in FIG. 7) that determines the fluid flow rate through the valve 100 based on the signal. In another example, the turbine shaft 136 or the impeller 400, rather than the wheel 140, can include magnetic material embedded therein or can be made of magnetic material, and the Hall Effect sensor 144 interacts with the magnetic material in the turbine shaft 136 or the impeller 400 to count its revolutions.

In another example, rather than the wheel 140 or the turbine 134, the Hall Effect sensor 144 may include a magnet therein. The magnet generates a magnetic field. Rotation of the wheel 140 disturbs such magnetic field, and the Hall Effect sensor 144 can determine the number of revolutions based on detecting such disturbance in magnetic field.

The accuracy of the flow rate meter may depend on the flow profile of the fluid upstream of the turbine 134 (i.e., fluid in the main chamber 111). Upstream disturbances impact the flow profile of the flow stream, which in turn affects flow meter accuracy. The throttling spool 130 may operate as a flow straightener as fluid is directed to flow through the through-holes 310-316. This way, upstream disturbances may be reduced.

The valve 100 includes a solenoid actuator 152 configured to actuate the throttling spool 130. The solenoid actuator 152 is depicted in FIG. 1 as a push-type solenoid actuator as an example for illustration. However, it should be understood that pull-type solenoid actuators, rotary actuators, manual actuators, hydraulic/pneumatic actuators could be used.

The solenoid actuator 152 includes a solenoid tube 154 disposed within, and received at, a proximal end of the housing 102. For example, the solenoid tube 154 can be threaded to the housing 102 at threaded region 155.

The solenoid actuator 152 further includes a solenoid coil 156 disposed about an exterior surface of the solenoid tube 154 between a nut 157 and the proximal end face of the housing 102. The solenoid tube 154 is configured to house a plunger or armature 158 that is axially-movable therein.

The solenoid tube 154 further houses a pole piece 160 coaxial with the armature 158 and fixedly disposed within the solenoid tube 154. For example, the pole piece 160 can have a flanged distal end that is interposed between a distal end of the solenoid tube 154 and a shoulder formed by the interior surface of the housing 102. This way, the pole piece 160 is secured in-place.

The pole piece 160 further defines a longitudinal channel therein, and a push pin 162 is disposed in the longitudinal channel of the pole piece 160. The longitudinal channel of the pole piece 160 has an enlarged section that houses a cap 164. The cap 164 is coupled to a rod 166 that is disposed through the turbine 134 as depicted in FIG. 1, and the rod 166 is also coupled to the throttling spool 130. This way, if the cap 164 moves axially (e.g., in the distal direction), the rod 166 move therewith, thereby also moving the throttling spool 130 in the distal direction.

The rod 166 is mounted through the turbine 134 such that the rod 166 can move axially relative to the turbine 134. The rod 166 can be used to center the turbine 134, the thrust bearing 138, and the throttling spool 130 within the housing 102.

The push pin 162 is disposed between the proximal end of the cap 164 and the armature 158. Further, the pole piece 160 is separated from the armature 158 by an airgap 168 traversed by the push pin 162 when the valve 100 is in the unactuated state shown in FIG. 1. The pole piece 160 can be composed of a material of high magnetic permeability.

Fluid from the first port 110 is communicated through the tube 106, the throttling spool 130, the turbine 134, and unsealed spaces in the valve 100 to within the solenoid tube 154. Fluid is further communicated through a longitudinal channel in the cap 164, through longitudinal channel of the pole piece 160 in which the push pin 162 is disposed and the airgap 168, then through an armature channel 169 to a back (proximal) end of the armature 158. This way, fluid from the first port 110 fills the solenoid tube 154, and thus the armature 158, as well as the push pin 162, are pressure-balanced.

The valve 100 is configured to operate in at least two modes of operation based on whether the solenoid actuator 152 is activated (i.e., whether the solenoid coil 156 is energized). Particularly, the valve 100 can operate in an actuated state in which the solenoid coil 156 is energized by electric power, e.g., an electric current provided via an electric connector 170. In the cross-sectional side view of FIG. 1, the electric connector 170 appears to be intersecting with the cable 148. However, they are disposed in different plane and do not interact. In the actuated state, the valve 100 operates in a first mode of operation providing pressure-compensated flow from the first port 110 to the second port 114.

Figure 5:
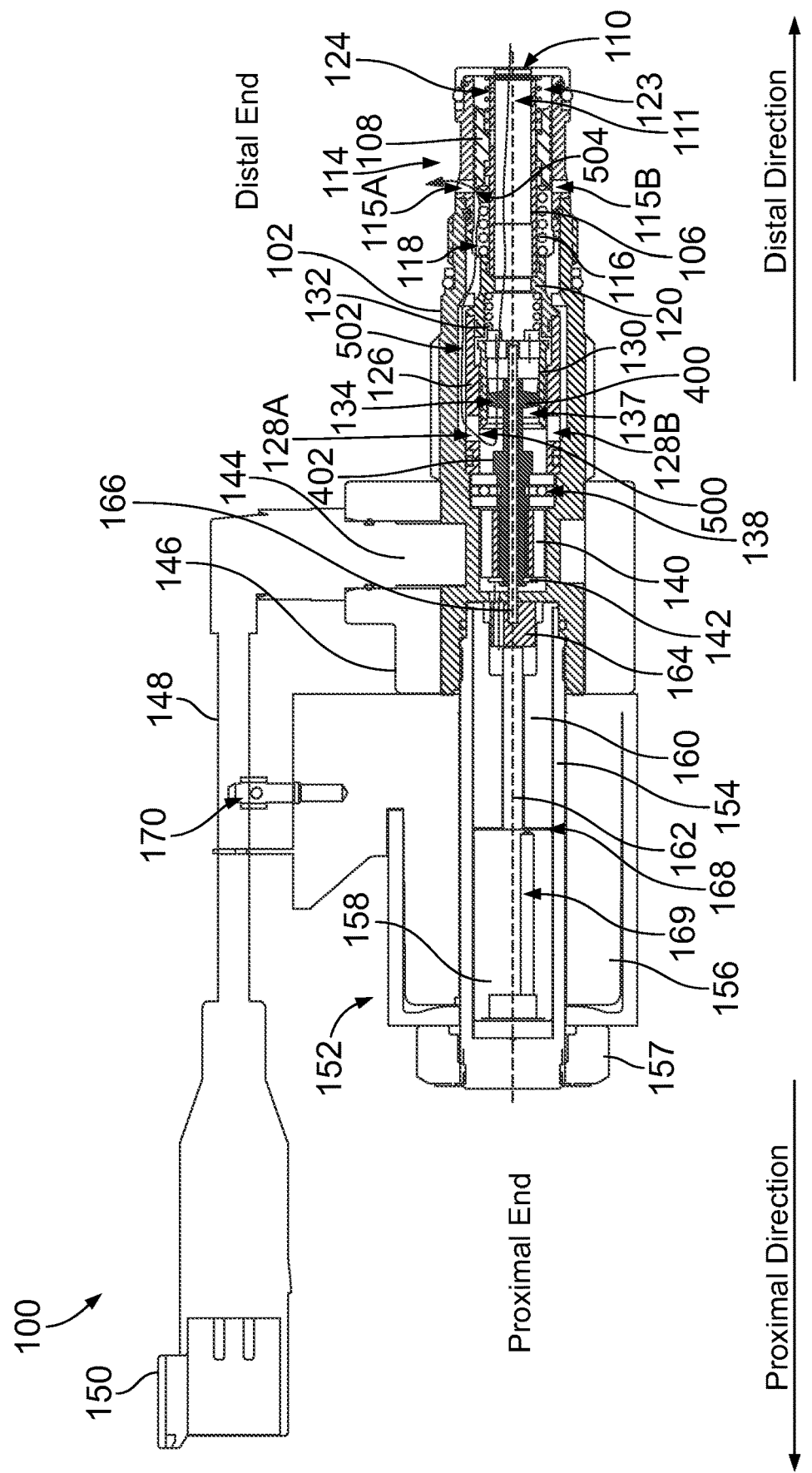
FIG. 5 illustrates a cross-sectional side view of the valve of FIG. 1 operating in a first mode of operation providing pressure-compensated flow from a first port to a second port, in accordance with an example implementation.

FIG. 5 illustrates a cross-sectional side view of the valve of FIG. 1 operating in a first mode of operation providing pressure-compensated flow from the first port 110 to the second port 114, in accordance with an example implementation. When an electric current is provided through the windings of the solenoid coil 156, a magnetic field is generated. The pole piece 160 directs the magnetic field through the airgap 168 toward the armature 158, which is movable and is attracted toward the pole piece 160. In other words, when an electric current is applied to the solenoid coil 156, the generated magnetic field forms a north and south pole in the pole piece 160 and the armature 158, and therefore the pole piece 160 and the armature 158 are attracted to each other. Because the pole piece 160 is fixed while the armature 158 is movable, the armature 158 is attracted and is movable across the airgap 168 toward the pole piece 160. Thus, when the electric current or voltage is provided to the solenoid coil 156, a solenoid force is generated and is applied to the armature 158, thereby attracting the armature 158 toward the pole piece 160.

As the armature 158 is attracted toward the pole piece 160, the armature 158 applies the solenoid force on the push pin 162. The armature 158 thus pushes the push pin 162 in the distal direction (e.g., to the right in FIGS. 1, 5), causing the push pin 162 to move axially in the distal direction, thereby applying a force on the cap 164, the rod 166, and the throttling spool 130 in the distal direction.

When the solenoid force overcomes the biasing force of the throttling spring 132 and friction forces, the push pin 162 can cause the throttling spool 130 to move axially in the distal direction as shown in FIG. 5 relative to FIG. 1. The axial distance that the armature 158, the push pin 162, the cap 164, the rod 166, and the throttling spool 130 move can be based on a magnitude of electric signal (e.g., electric current) provided to the solenoid coil 156 (i.e., based on a magnitude of the solenoid force generated by the electric signal).

As the throttling spool 130 moves in the distal direction, the throttling spring 132 is compressed and its biasing force increases. The throttling spool 130 can move in the distal direction to a particular axial position at which force equilibrium between forces acting on the throttling spool 130 is achieved. Based on the magnitude of the solenoid force, the throttling spool 130 can move a sufficient axial distance to an axial position at which the proximal end of the throttling spool 130 moves past the proximal edge of the throttling cross-holes 128A, 128B, thereby forming a throttling variable orifice or throttling flow area 500.

At such axial position, fluid is allowed to flow from the first port 110 through the main chamber 111, through the through-holes 310-316 of the throttling spool 130, across the impeller 400 of the turbine 134, through the turbine chamber 137, then through the throttling flow area 500, through an annular space 502, which is a portion of the pressure compensation chamber 118. Thus the pressure compensation chamber 118 can be considered to include the annular space 502, the slots (e.g., the slot 202) of the bushing 120, and the chamber portion in which the pressure compensation spring 116 is disposed.

As mentioned above, fluid received at the first port 110 is communicated via cross-hole 124 of the tube 106 to the spring chamber 123 and applies a force in the proximal direction (e.g., to the left in FIGS. 1, 5) on the pressure compensation spool 108. Defining an outer diameter of the pressure compensation spool 108 as $D_1$, a corresponding surface area $A_1$ is determined as $$A_1 = \pi \frac{D_1^2}{4}.$$

Defining an inner diameter of the pressure compensation spool 108 as $D_2$, a corresponding surface area $A_2$ is determined as $$A_2 = \pi \frac{D_2^2}{4}.$$

Thus, fluid received at the first port 110 applies a fluid force to the pressure compensation spool 108 in the proximal direction that is equal to $F_1=P_1(A_1-A_2)$, where $P_1$ is pressure level of fluid at the first port 110.

Defining pressure level of fluid in the pressure compensation chamber 118 as $P_{COMP}$, pressurized fluid in the pressure compensation chamber 118 applies a force to the pressure compensation spool 108 in the distal direction that is equal to $F_{COMP}=P_{COMP}(A_1-A_2)$. Further, the pressure compensation spring 116 applies a biasing force $F_{COMP\_SP}$ on the pressure compensation spool 108 in the distal direction. Thus, a force equilibrium equation of forces acting on the pressure compensation spool 108 can be stated as follows:

$$F_{COMP\_SP}+F_{COMP}=F_1 \quad (1)$$

The pressure compensation spool 108 may thus move to an axial position that achieves force equilibrium according to equation 1. In such equilibrium position, a pressure compensation variable orifice or pressure compensation flow area 504 is formed between the proximal end of the pressure compensation spool 108 and the proximal edges of the pressure compensation cross-holes 115A, 115B. As a result, fluid flows from the pressure compensation chamber 118 through the pressure compensation flow area 504 and the pressure compensation cross-holes 115A, 115B to the second port 114.

As a result of fluid flow across the turbine 134, a pressure drop occurs between pressure level in the main chamber 111 (i.e., pressure level $P_1$) and a pressure level ($P_{Turbine}$) in the turbine chamber 137. Further, as a result of fluid flow through the throttling flow area 500, a pressure drop occurs between pressure level $P_{Turbine}$ in the turbine chamber 137 and the pressure level $P_{COMP}$ in the pressure compensation chamber 118. Thus, a portion of pressure drop occurs across the turbine 134 and another portion occurs across the throttling flow area 500.

Using the Bernoulli orifice equation, the fluid flow rate Q through the throttling flow area 500 can be determined as:

$$Q=K_1\sqrt{(P_{Turbine}-P_{COMP})} \quad (2)$$

where $K_1$ is a variable that is proportional to the size of the throttling flow area 500, which is determined based on the extent of axial movement of the throttling spool 130.

The fluid flowing across the throttling flow area 500 also flows through the pressure compensation flow area 504 at the same flow rate Q. Thus, the flow rate Q can also be expressed as a function of pressure drop across the pressure compensation flow area 504 as follows:

$$Q=K_2\sqrt{(P_{COMP}-P_2)} \quad (3)$$

where $P_2$ is the pressure level at the second port 114 and where $K_2$ is a variable that is proportional to the size of the pressure compensation flow area 504, which is determined based on the axial position of the pressure compensation spool 108.

The pressure drop across the throttling flow area 500 causes the pressure level $P_{COMP}$ to become less than $P_{Turbine}$ (which is less than $P_1$), and therefore the force $F_1$ becomes larger than $F_{COMP}$. Based on equation (1), the pressure compensation spool 108 can responsively move axially to a particular axial position where an equilibrium is achieved between the three forces $F_{COMP\_SP}$, $F_{COMP}$, and $F_1$.

Particularly, the pressure level $P_{COMP}$ is adjusted as the pressure compensation spool 108 moves so as to maintain the force equilibrium. If the pressure compensation spool 108 moves to the right, a size of the pressure compensation flow area 504 increases and $K_2$ increases. As a result, pressure drop across the pressure compensation flow area 504 is reduced as fluid flows therethrough. Thus, based on equation (3), $P_{COMP}$ decreases for a given flow rate Q across the pressure compensation flow area 504 and a given pressure level $P_2$ at the second port 114.

Conversely, if the pressure compensation spool 108 moves to the left, a size of the pressure compensation flow area 504 decreases and $K_2$ decreases. As a result, pressure drop across the pressure compensation flow area 504 increases as fluid flows therethrough. Thus, based on equation (3), $P_{COMP}$ increases for a given flow rate across the pressure compensation flow area 504 and a given pressure level $P_2$ at the second port 114.

Equation (1) can be expressed as follows:

$$F_{COMP\_SP} = F_1 - F_{COMP} = P_1(A_1 - A_2) - P_{COMP}(A_1 - A_2) \quad (4)$$

$$\Rightarrow F_{COMP\_SP} = (P_1 - P_{COMP})(A_1 - A_2)$$

From equation (4), the pressure drop ($P_1-P_{COMP}$) can be expressed as a function of the biasing force $F_{COMP\_SP}$ of the pressure compensation spring 116 and the area difference ($A_1-A_2$) as follows:

$$P_1 - P_{COMP} = \frac{F_{COMP\_SP}}{(A_1 - A_2)} \quad (5)$$

Equation (5) indicates that the pressure drop ($P_1-P_{COMP}$) across the turbine 134 and throttling flow area 500 can be maintained substantially constant based on parameters of the pressure compensation spring 116 (e.g., spring rate, preload, etc.) and the diameters $D_1$, $D_2$, which determine the areas $A_1$, $A_2$, respectively. For example, the parameters of the pressure compensation spring 116 and the diameters $D_1$, $D_2$, can be selected such that the pressure drop ($P_1-P_{COMP}$) is equal to 150 psi, and the pressure compensation spool 108 moves axially to a position that achieves such pressure drop regardless of the pressure levels $P_1$ and $P_2$.

As mentioned above, a portion of the pressure drop (i.e., a first pressure differential) occurs across the turbine 134 and another portion (i.e., a second pressure differential) occurs across the throttling flow area 500. The pressure differential or drop ($P_1-P_{COMP}$) is equal to the sum of the first pressure differential and the second pressure differential. For example, a 50 psi pressure drop ($P_1-P_{Turbine}$) can occur across the turbine 134 and a 100 psi pressure drop ($P_{Turbine}-$ $P_{COMP}$) can occur across the throttling flow area 500. The term "substantially constant" is used herein to indicate that the pressure differential remains within a threshold value or percentage from a particular pressure differential value (e.g., the pressure differential remains within ±5 psi or 2-3% of a 150 psi pressure differential).

As an example for illustration, the pressure level $P_1$ at the first port 110 can be 3000 psi, and thus the pressure compensation spool 108 moves axially such that a size of the pressure compensation flow area 504 causes the pressure level $P_{COMP}$ in the pressure compensation chamber 118 to be 2850 psi to maintain a pressure drop of 150 psi across the turbine 134 and the throttling flow area 500. If pressure level $P_1$ at the first port 110 increases from 3000 psi to 5000 psi, the pressure compensation spool 108 responsively moves axially in the proximal direction (e.g., to the left in FIG. 2) to reduce a size of the pressure compensation flow area 504, thereby increasing the pressure drop thereacross and increasing the pressure level $P_{COMP}$ in the pressure compensation chamber 118 to 4850 psi to maintain the pressure drop of 150 psi across the turbine 134 and the throttling flow area 500.

Conversely, if the pressure level $P_1$ at the first port 110 decreases from 3000 psi to 2000 psi, the pressure compensation spool 108 responsively moves axially in the distal direction (e.g., to the right in FIG. 2) to increase the size of the pressure compensation flow area 504, thereby decreasing the pressure drop thereacross and decreasing the pressure level $P_{COMP}$ in the pressure compensation chamber 118 to 1850 psi to maintain the pressure drop of 150 psi across the turbine 134 and the throttling flow area 500.

Referring back to equation (1), if the pressure drop $(P_1-P_{COMP})$ across the turbine 134 and the throttling flow area 500, and thus the pressure drop $(P_{Turbine}-P_{COMP})$, is maintained substantially constant, the flow rate Q becomes proportional to the variable $K_1$, which is proportional to the size of the throttling flow area 500, which in turn is determined based on the axial position of the throttling spool 130. As such, the valve 100 is pressure-compensated such that the proportionality between the magnitude of the command to the solenoid coil 156 and the flow rate Q from the first port 110 to the second port 114 is maintained regardless of changes in the pressure level $P_1$ at the first port 110 or changes in the pressure level $P_2$ at the second port 114.

At the same time the valve 100 is providing a pressure-compensated fluid flow from the first port 110 to the second port 114, the flow rate sensor provides a signal indicative of the fluid flow rate across the valve 100. Particularly, as fluid flows across the impeller 400, the turbine 134 as well as the wheel 140 rotate. The Hall Effect sensor 144 provides a sensor signal indicative of the count of revolutions of the wheel 140, and such count of revolutions is indicative of the fluid flow rate from the first port 110 to the second port 114.

Thus, the flow rate sensor can confirm that a particular, expected fluid flow rate is flowing through the valve 100. Also, the flow rate sensor monitors the actual flow rate through the valve 100. This can allow the user to meet safety requirements for flow control valves because the signal from the Hall Effect sensor 144 is a more accurate indication of flow rate compared to conventional methods involving measuring linear position or stroke of a spool or movable element, which can be inaccurate due to friction and malfunction issues.

Advantageously, with the configuration of the valve 100, the flow rate sensor is integrated in the valve 100 and there is no need for a separate flow meter to be installed in the system. A separate flow meter may require a separate cavity and plumbing in a hydraulic system or manifold. As such, the configuration of the valve 100 with the integrated flow meter may reduce cost and enhance reliability of the hydraulic system. Also, the flow rate sensor information might not be delayed as in conventional system where there is capacitance between a separate flow rate sensor and the valve.

Further, by virtue of the valve 100 being a pressure-compensated flow control valve, a fixed, predictable pressure drop occurs across the turbine 134 and a particular fluid flow rate is achieved proportional to the size of the throttling flow area 500. This configuration limits the torque and speeds that the turbine 134 is subjected to. This may protect the turbine 134 from damage that could occur in conventional flow meters resulting from high pressure differentials and large flow rates across a turbine.

When the solenoid coil 156 is de-energized (e.g., command signal to the solenoid coil 156 is reduced or removed), the armature 158 is no longer attracted by a magnetic force toward the pole piece 160, and the throttling spring 132 pushes the throttling spool 130 in the proximal direction. As the throttling spool 130 moves in the proximal direction to return to an unactuated axial position, the throttling cross-holes 128A, 128B can be blocked again.

The valve 100 is configured to operate in a second mode of operation that can be referred to as a reverse free flow mode of operation. This mode of operation allows for fluid free flow from the second port 114 to the first port 110. The term "free" indicates that fluid flow can occur at a substantially low pressure (e.g., 10-15 psi) at the second port 114.

Figure 6:
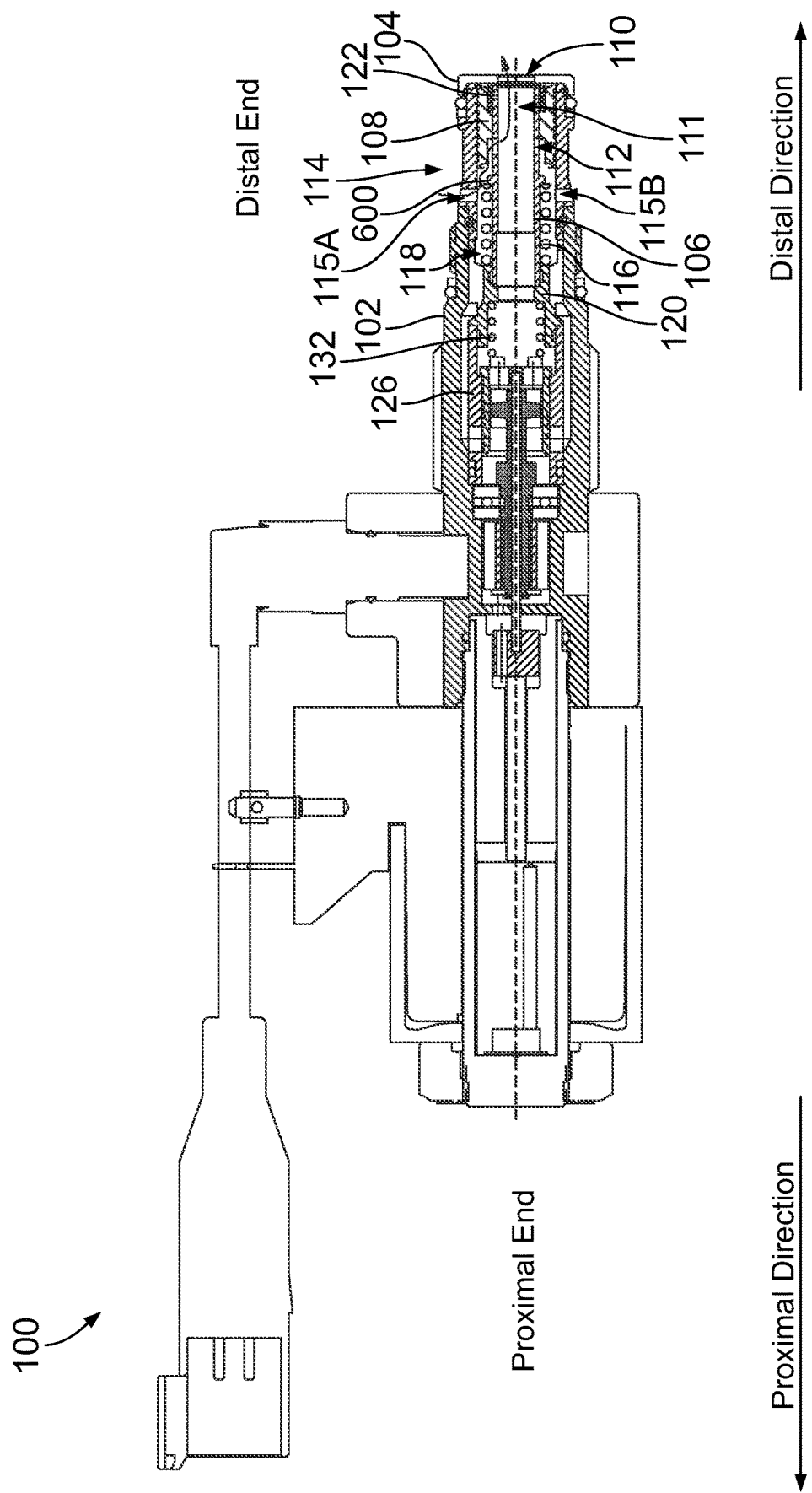
FIG. 6 illustrates a cross-sectional side view of the valve of FIG. 1 operating in a reverse flow mode of operation, in accordance with an example implementation.

FIG. 6 illustrates a cross-sectional side view of the valve 100 operating in a reverse flow mode of operation, in accordance with an example implementation. When fluid is provided to the second port 114, such fluid applies a force on the pressure compensation spool 108 in the distal direction. In this mode of operation, the first port 110 may be fluidly coupled to a low pressure reservoir (e.g., a fluid reservoir of the hydraulic system having atmospheric pressure level or low pressure level such as 70 psi). As such, the fluid received at the second port 114 pushes the pressure compensation spool 108 in the distal direction against the reverse flow spring 122 (which is a weak spring as mentioned above).

The pressure compensation spool 108 can thus move to an axial position at which the pressure compensation spool 108 no longer blocks the cross-hole(s) 112 of the tube 106. Rather, the cross-hole(s) 112 are exposed and allow fluid flow from the second port 114 to the main chamber 111, then to the first port 110 as shown in FIG. 6. The tube 106 has protrusions or a shoulder 600 that acts as a stop for the distal end of the pressure compensation spring 116 and precludes it from following the pressure compensation spool 108.

Figure 7:
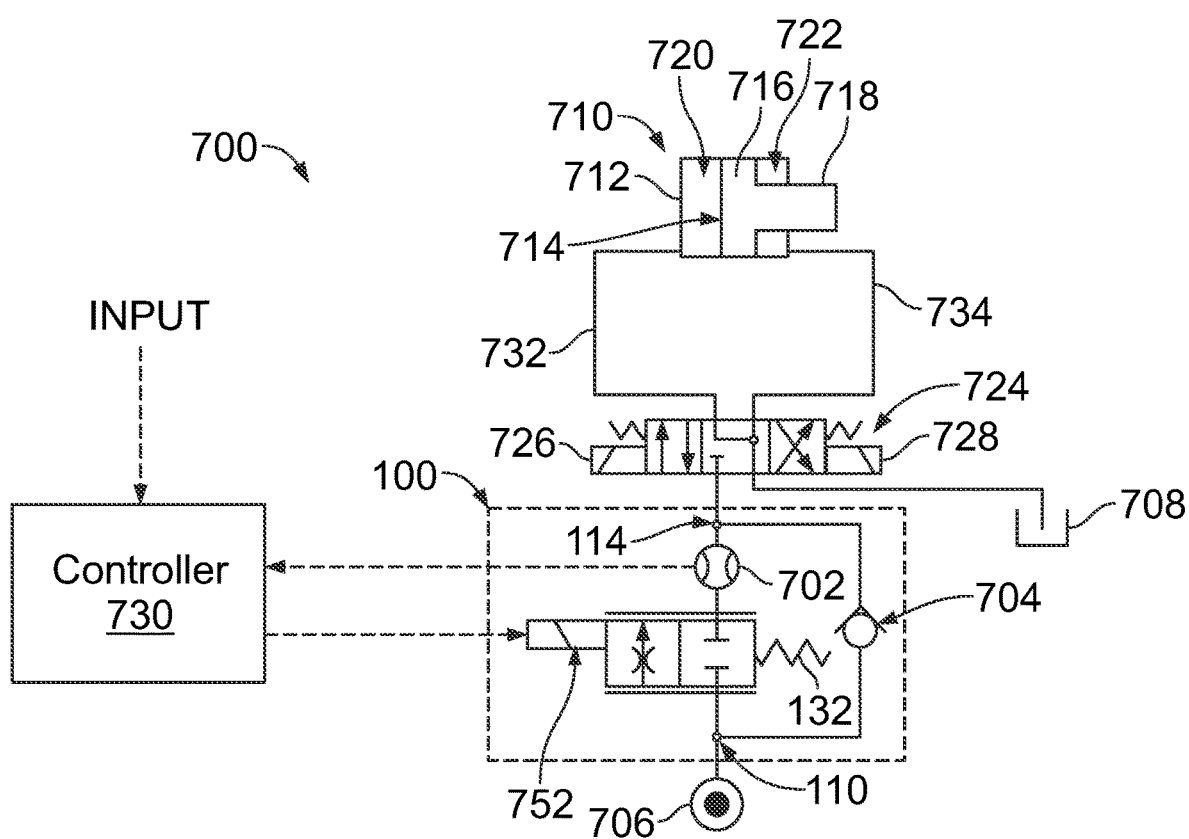
FIG. 7 illustrates a hydraulic system, in accordance with an example implementation.

FIG. 7 illustrates a hydraulic system 700, in accordance with an example implementation. The hydraulic system 700 includes the valve 100 represented symbolically. The flow rate sensor (i.e., the combination of the turbine 134, the wheel 140, and the Hall Effect sensor 144, etc.) are represented as flow rate sensor 702. The reverse flow mode of operation allowing free flow from the second port 114 to the first port 110 is represented as a check valve 704.

The hydraulic system 700 includes a source 706 of fluid such as a pump, an accumulator, or another portion of the hydraulic system. The first port 110 of the valve 100 is fluidly-coupled to the source 706. The hydraulic system 700 also includes a fluid reservoir 708 that can store fluid at a low pressure (e.g., 0-70 psi).

In the hydraulic system 700, the valve 100 can be configured as a meter-in valve configured to control fluid flow to and from an actuator 710. The actuator 710 includes a cylinder 712 and an actuator piston 714 slidably-accommodated in the cylinder 712. The actuator piston 714 includes a piston head 716 and a piston rod 718 extending from the piston head 716 along a central longitudinal axis direction of the cylinder 712. The piston head 716 divides the inner space of the cylinder 712 into a first chamber 720 and a second chamber 722.

The hydraulic system 700 includes a directional control valve 724 that directs fluid to and from the actuator 710. In an example, the directional control valve 724 can include four ports: an inlet port that is fluidly-coupled to the second port 114 of the valve 100, a return port that is fluidly-coupled to the fluid reservoir 708, a first valve workport that is fluidly-coupled to the first chamber 720 of the actuator 710, and a second valve workport that is fluidly-coupled to the second chamber 722.

In an example, the directional control valve 724 can be as spool type valve having a spool that is axially-movable within a bore in a valve body of the directional control valve 724. In this example, the spool can be biased to a neutral position by two springs on opposite sides of the spool as depicted symbolically in FIG. 7. In the example implementation of FIG. 7, in such neutral position, the two valve workports can be fluidly-coupled to the fluid reservoir 708. In other examples, the spool may block all ports at the neutral position.

The directional control valve 724 can be electrically-actuated. For instance, the directional control valve 724 can have a first solenoid 726 and a second solenoid 728 that, when energized, move the spool within the directional control valve 724.

The hydraulic system 700 further includes a controller 730. The controller 730 can include one or more processors or microprocessors and may include data storage (e.g., memory, transitory computer-readable medium, non-transitory computer-readable medium, etc.). The data storage may have stored thereon instructions that, when executed by the one or more processors of the controller 730, cause the controller 730 to perform operations described herein. Signal lines to and from the controller 730 are depicted as dashed lines in FIG. 7. The controller 730 can receive input or input information comprising input commands indicating a target flow rate or speed for the actuator piston 714 and sensor information via signals from the flow rate sensor 702. In response, the controller 730 provides electrical signals to various components of the hydraulic system 700 such as the solenoid actuator 152 of the valve 100, the first solenoid 726, and the second solenoid 728.

For example, the controller 730 can receive a command or input information requesting extending the actuator piston 714 at a particular speed. To achieve the particular speed, the controller 730 controls the amount of fluid flow rate through the valve 100.

The controller 730 can operate the valve 100 in the first mode of operation (pressure compensation mode described above with respect to FIG. 5). The controller 730 can also actuate the first solenoid 726. This way, fluid is provided from the first port 110 to the second port 114, then to the inlet port of the directional control valve 724, which directs fluid to the first valve workport, then through fluid line 732 to the first chamber 720 to extend the actuator piston 714. Fluid discharged from the second chamber 722 flows through fluid line 734 to the second valve workport of the directional control valve 724, which directs fluid to the return port, then to the fluid reservoir 708.

During operation, the controller 730 receives from the flow rate sensor 702 information indicative of the fluid flow rate through the valve 100. The controller 730 can compare the actual fluid flow rate indicated by the flow rate sensor 702 to a target or commanded fluid flow rate that achieves the particular commanded speed. The controller 730 can then adjust the command signal (i.e., adjust the magnitude of the electric current or voltage) sent to the solenoid actuator 152 of the valve 100 to achieve the target fluid flow rate. As such, the controller 730 can implement a closed-loop feedback control system to achieve the target flow rate based on feedback signals from the flow rate sensor 702.

To retract the actuator piston 714, the controller 730 can send a signal to the second solenoid 728 of the directional control valve 724. This way, fluid from the source 706 can be directed to the second chamber 722.

The configuration of the hydraulic system 700 is a simplified example for illustration. Other system configurations can be used. For example, while the reverse flow feature of the valve 100 might not be used in the hydraulic system 700, other hydraulic system could take advantage of such feature.

In conventional systems, a position sensor may be mounted to the cylinder 712 and/or the actuator piston 714 of the actuator 710 to provide an indication of the position of the actuator piston 714. However, such implementation might not be feasible, for example, in telescopic cylinders with long piston strokes. Further, such position sensor might be expensive.

In other conventional systems, a servo proportional directional control valve can be used to accurately control flow rate through the directional control valve. These valves, however, tend to be costly, and might not be suitable for all applications.

In other conventional systems, a separate flow rate sensor can be disposed in fluid lines, such as the fluid line 732, to provide an indication of flow rate to the controller of the system. However, due to capacitance in hydraulic lines (e.g., hoses), the signal may be delayed compared to actual flow rate. Further, complexity of the system increases due to extra fluid connections to the separate flow rate sensor.

The configuration of FIG. 7 and the valve 100 with an integrated flow rate sensor may thus offer enhancements over conventional hydraulic systems. The valve 100 can be used with any type of cylinder regardless of the stroke of the piston. Further, a cheap on/off directional control valve, such as the directional control valve 724, can be used instead of an expensive servo proportional directional control valve. Also, due to the flow rate sensor being integrated with the valve 100 where throttling occurs, any delay in the signal is reduced or eliminated, thereby enabling more accurate control of the speed and/or position of the actuator piston 714.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiments (EEEs) listed below.

EEE 1 is a valve comprising: a pressure compensation spool configured to be subjected to a first fluid force of fluid received at a first port of the valve acting on the pressure compensation spool in a proximal direction; a pressure compensation spring disposed in a pressure compensation chamber and applying a biasing force on the pressure compensation spool in a distal direction; a turbine configured to rotate as fluid received at the first port flows through the valve; and a throttling flow area configured to throttle fluid flow from the first port to the pressure compensation chamber, wherein fluid in the pressure compensation chamber applies a second fluid force on the pressure compensation spool in the distal direction, such that the pressure compensation spool moves to a particular axial position based on force equilibrium between the first fluid force, the second fluid force, and the biasing force to throttle fluid flow from the pressure compensation chamber to a second port of the valve, thereby causing a pressure differential across the turbine and the throttling flow area to be maintained substantially constant.

EEE 2 is the valve of EEE 1, further comprising: a main chamber disposed upstream from the turbine and configured to receive fluid from the first port; and a turbine chamber in which the turbine is disposed, wherein the throttling flow area is located downstream from the turbine chamber, and wherein the pressure differential comprises a first pressure differential across the turbine between the main chamber and the turbine chamber and a second pressure differential across the throttling flow area between the turbine chamber and the pressure compensation chamber.

EEE 3 is the valve of any of EEEs 1-2, further comprising: a Hall Effect sensor configured to sense rotation of the turbine and provide a signal indicative of a count of revolutions of the turbine to facilitate determining fluid flow rate of fluid flowing from the first port to the second port.

EEE 4 is the valve of EEE 3, wherein the turbine comprises an impeller mounted to a turbine shaft, and wherein the valve further comprises: a wheel mounted to the turbine shaft and rotatable therewith, wherein the Hall Effect sensor is mounted adjacent the wheel.

EEE 5 is the valve of EEE 4, wherein the wheel comprises magnetic material, wherein the Hall Effect sensor is configured to interact with the magnetic material of the wheel to count the revolutions of the turbine.

EEE 6 is the valve of any of EEEs 1-5, further comprising: a sleeve; and a throttling spool that is axially-movable within the sleeve, wherein as the throttling spool moves in an axial direction, the throttling flow area is formed between the throttling spool and one or more throttling cross-holes formed in the sleeve, and wherein a size of the throttling flow area is adjustable based on an axial position of the throttling spool.

EEE 7 is the valve of EEE 6, wherein the turbine is disposed within the throttling spool, wherein the throttling spool comprises one or more longitudinal through-holes allowing fluid flow therethrough, and one or more flat portions protruding from a distal end of the throttling spool, and wherein the valve further comprises: a throttling spring resting against the one or more flat portions and applying a biasing force on the throttling spool in the proximal direction.

EEE 8 is the valve of EEE 7, further comprising: a solenoid actuator having a solenoid coil and an armature, wherein when the solenoid coil is energized, the armature moves axially, thereby causing the throttling spool to move axially therewith.

EEE 9 is the valve of EEE 8, further comprising: a rod configured to move with the armature, wherein the rod is disposed through the turbine and is coupled to the throttling spool, such that axial movement of the armature causes the rod and the throttling spool to move therewith.

EEE 10 is the valve of any of EEEs 1-9, wherein the turbine comprises a turbine shaft, and wherein the valve further comprises: a thrust bearing supporting the turbine shaft against axial loads and facilitating rotation of the turbine shaft.

EEE 11 is the valve of any of EEEs 1-10, further comprising: a housing having a longitudinal cylindrical cavity in which the pressure compensation spool and the turbine are disposed; and a tube fixedly-disposed within the longitudinal cylindrical cavity of the housing, wherein the pressure compensation spool is slidably-accommodated about an exterior surface of the tube.

EEE 12 is the valve of EEE 11, wherein the pressure compensation spring is disposed about the exterior surface of the tube.

EEE 13 is the valve of any of EEEs 11-12, wherein a portion of the pressure compensation chamber is formed between the exterior surface of the tube and an interior surface of the housing.

EEE 14 is the valve of any of EEEs 11-13, wherein the housing comprises a pressure compensation cross-hole, and wherein axial movement of the pressure compensation spool varies a size of a pressure compensation flow area formed between the pressure compensation spool and an edge of the pressure compensation cross-hole to throttle fluid flow from the pressure compensation chamber to the second port.

EEE 15 is the valve of any of EEEs 11-14, further comprising: a nose piece disposed at a distal end of the housing; and a reverse flow spring disposed between the pressure compensation spool and the nose piece, such that the reverse flow spring applies a respective biasing force on the pressure compensation spool in the proximal direction, wherein when pressurized fluid is received at the second port, the pressurized fluid pushes the pressure compensation spool in the distal direction against the reverse flow spring, allowing fluid flow to the first port.

EEE 16 is the valve of EEE 15, wherein the tube comprises one or more cross-holes, and wherein when pressurized fluid pushes the pressure compensation spool in the distal direction against the reverse flow spring, fluid flows through the one or more cross-holes of the tube, through a main chamber within the tube to the first port.

EEE 17 is a hydraulic system comprising: an actuator comprising a cylinder and an actuator piston slidably-accommodated within the cylinder, wherein the actuator piston divides an inner space of the cylinder to a first chamber and a second chamber; a directional control valve configured to direct fluid flow to and from the first chamber and the second chamber of the actuator; a source of fluid flow; a valve comprising a first port fluidly-coupled to the source of fluid flow and a second port fluidly-coupled to the directional control valve. The valve further comprises: a pressure compensation spool configured to be subjected to a first fluid force of fluid received at the first port acting on the pressure compensation spool in a proximal direction, a pressure compensation spring disposed in a pressure compensation chamber and applying a biasing force on the pressure compensation spool in a distal direction, a turbine configured to rotate as fluid received at the first port flows through the valve, a throttling flow area configured to throttle fluid flow from the first port to the pressure compensation chamber, wherein fluid in the pressure compensation chamber applies a second fluid force on the pressure compensation spool in the distal direction, such that the pressure compensation spool moves to a particular axial position based on force equilibrium between the first fluid force, the second fluid force, and the biasing force to throttle fluid flow from the pressure compensation chamber to the second port of the valve, thereby causing a pressure differential across the turbine and the throttling flow area to be maintained substantially constant, and a Hall Effect sensor configured to sense rotation of the turbine and provide a signal indicative of a count of revolutions of the turbine to facilitate determining fluid flow rate of fluid flowing from the first port to the second port. The hydraulic system further includes a controller configured to perform operations comprising: receiving sensor information from the Hall Effect sensor to determine actual fluid flow rate through the valve, comparing the actual fluid flow rate to a target fluid flow rate, and based on the comparing, providing an actuation signal to the valve to achieve the target fluid flow rate.

EEE 18 is the hydraulic system of EEE 17, wherein the valve further comprises: a sleeve; and a throttling spool that is axially-movable within the sleeve, wherein as the throttling spool moves in an axial direction, the throttling flow area is formed between the throttling spool and one or more throttling cross-holes formed in the sleeve, and wherein a size of the throttling flow area is adjustable based on an axial position of the throttling spool.

EEE 19 is the hydraulic system of EEE 18, wherein the valve further comprises: a solenoid actuator having a solenoid coil and an armature, wherein when the solenoid coil is energized, the armature moves axially, thereby causing the throttling spool to move axially therewith, and wherein providing the actuation signal to the valve to achieve the target fluid flow rate comprises: providing the actuation signal to the solenoid coil of the solenoid actuator.

EEE 20 is the hydraulic system of any of EEEs 18-19, wherein the controller is configured to perform further operations comprising: receiving a commanded speed for the actuator piston; and determining the target fluid flow rate based on the commanded speed.

What is claimed is:

1. A valve comprising:
   a pressure compensation spool configured to be subjected to a first fluid force of fluid received at a first port of the valve acting on the pressure compensation spool in a proximal direction;
   a pressure compensation spring disposed in a pressure compensation chamber and applying a biasing force on the pressure compensation spool in a distal direction;
   a turbine configured to rotate as fluid received at the first port flows through the valve; and
   a throttling flow area configured to throttle fluid flow from the first port to the pressure compensation chamber, wherein fluid in the pressure compensation chamber applies a second fluid force on the pressure compensation spool in the distal direction, such that the pressure compensation spool moves to a particular axial position based on force equilibrium between the first fluid force, the second fluid force, and the biasing force to throttle fluid flow from the pressure compensation chamber to a second port of the valve, thereby causing a pressure differential across the turbine and the throttling flow area to be maintained substantially constant.

2. The valve of claim 1, further comprising:
   a main chamber disposed upstream from the turbine and configured to receive fluid from the first port; and
   a turbine chamber in which the turbine is disposed, wherein the throttling flow area is located downstream from the turbine chamber, and wherein the pressure differential comprises a first pressure differential across the turbine between the main chamber and the turbine chamber and a second pressure differential across the throttling flow area between the turbine chamber and the pressure compensation chamber.

3. The valve of claim 1, further comprising:
   a Hall Effect sensor configured to sense rotation of the turbine and provide a signal indicative of a count of revolutions of the turbine to facilitate determining fluid flow rate of fluid flowing from the first port to the second port.

4. The valve of claim 3, wherein the turbine comprises an impeller mounted to a turbine shaft, and wherein the valve further comprises:
   a wheel mounted to the turbine shaft and rotatable therewith, wherein the Hall Effect sensor is mounted adjacent the wheel.

5. The valve of claim 4, wherein the wheel comprises magnetic material, wherein the Hall Effect sensor is configured to interact with the magnetic material of the wheel to count the revolutions of the turbine.

6. The valve of claim 1, further comprising:
a sleeve; and
a throttling spool that is axially-movable within the sleeve, wherein as the throttling spool moves axially, the throttling flow area is formed between the throttling spool and one or more throttling cross-holes formed in the sleeve, and wherein a size of the throttling flow area is adjustable based on an axial position of the throttling spool.

7. The valve of claim 6, wherein the turbine is disposed within the throttling spool, wherein the throttling spool comprises one or more longitudinal through-holes allowing fluid flow therethrough, and one or more flat portions protruding from a distal end of the throttling spool, and wherein the valve further comprises:
a throttling spring resting against the one or more flat portions and applying a biasing force on the throttling spool in the proximal direction.

8. The valve of claim 7, further comprising:
a solenoid actuator having a solenoid coil and an armature, wherein when the solenoid coil is energized, the armature moves axially, thereby causing the throttling spool to move axially therewith.

9. The valve of claim 8, further comprising:
a rod configured to move with the armature, wherein the rod is disposed through the turbine and is coupled to the throttling spool, such that axial movement of the armature causes the rod and the throttling spool to move therewith.

10. The valve of claim 1, wherein the turbine comprises a turbine shaft, and wherein the valve further comprises:
a thrust bearing supporting the turbine shaft against axial loads and facilitating rotation of the turbine shaft.

11. The valve of claim 1, further comprising:
a housing having a longitudinal cylindrical cavity in which the pressure compensation spool and the turbine are disposed; and
a tube fixedly-disposed within the longitudinal cylindrical cavity of the housing, wherein the pressure compensation spool is slidably-accommodated about an exterior surface of the tube.

12. The valve of claim 11, wherein the pressure compensation spring is disposed about the exterior surface of the tube.

13. The valve of claim 11, wherein a portion of the pressure compensation chamber is formed between the exterior surface of the tube and an interior surface of the housing.

14. The valve of claim 11, wherein the housing comprises a pressure compensation cross-hole, and wherein axial movement of the pressure compensation spool varies a size of a pressure compensation flow area formed between the pressure compensation spool and an edge of the pressure compensation cross-hole to throttle fluid flow from the pressure compensation chamber to the second port.

15. The valve of claim 11, further comprising:
a nose piece disposed at a distal end of the housing; and
a reverse flow spring disposed between the pressure compensation spool and the nose piece, such that the reverse flow spring applies a respective biasing force on the pressure compensation spool in the proximal direction, wherein when pressurized fluid is received at the second port, the pressurized fluid pushes the pressure compensation spool in the distal direction against the reverse flow spring, allowing fluid flow to the first port.

16. The valve of claim 15, wherein the tube comprises one or more cross-holes, and wherein when pressurized fluid pushes the pressure compensation spool in the distal direction against the reverse flow spring, fluid flows through the one or more cross-holes of the tube, through a main chamber within the tube to the first port.

17. A hydraulic system comprising:
an actuator comprising a cylinder and an actuator piston slidably-accommodated within the cylinder, wherein the actuator piston divides an inner space of the cylinder to a first chamber and a second chamber;
a directional control valve configured to direct fluid flow to and from the first chamber and the second chamber of the actuator;
a source of fluid flow;
a valve comprising a first port fluidly-coupled to the source of fluid flow and a second port fluidly-coupled to the directional control valve, wherein the valve further comprises:
a pressure compensation spool configured to be subjected to a first fluid force of fluid received at the first port acting on the pressure compensation spool in a proximal direction,
a pressure compensation spring disposed in a pressure compensation chamber and applying a biasing force on the pressure compensation spool in a distal direction,
a turbine configured to rotate as fluid received at the first port flows through the valve,
a throttling flow area configured to throttle fluid flow from the first port to the pressure compensation chamber, wherein fluid in the pressure compensation chamber applies a second fluid force on the pressure compensation spool in the distal direction, such that the pressure compensation spool moves to a particular axial position based on force equilibrium between the first fluid force, the second fluid force, and the biasing force to throttle fluid flow from the pressure compensation chamber to the second port of the valve, thereby causing a pressure differential across the turbine and the throttling flow area to be maintained substantially constant, and
a Hall Effect sensor configured to sense rotation of the turbine and provide a signal indicative of a count of revolutions of the turbine to facilitate determining fluid flow rate of fluid flowing from the first port to the second port; and
a controller configured to perform operations comprising:
receiving sensor information from the Hall Effect sensor to determine actual fluid flow rate through the valve,
comparing the actual fluid flow rate to a target fluid flow rate, and
based on the comparing, providing an actuation signal to the valve to achieve the target fluid flow rate.

18. The hydraulic system of claim 17, wherein the valve further comprises:
a sleeve; and
a throttling spool that is axially-movable within the sleeve, wherein as the throttling spool moves axially, the throttling flow area is formed between the throttling spool and one or more throttling cross-holes formed in the sleeve, and wherein a size of the throttling flow area is adjustable based on an axial position of the throttling spool.

19. The hydraulic system of claim 18, wherein the valve further comprises:
- a solenoid actuator having a solenoid coil and an armature, wherein when the solenoid coil is energized, the armature moves axially, thereby causing the throttling spool to move axially therewith, and wherein providing the actuation signal to the valve to achieve the target fluid flow rate comprises:
- providing the actuation signal to the solenoid coil of the solenoid actuator.

20. The hydraulic system of claim 18, wherein the controller is configured to perform further operations comprising:
- receiving a commanded speed for the actuator piston; and
- determining the target fluid flow rate based on the commanded speed.

\* \* \* \* \*